US008998500B2

(12) United States Patent
Kawamura et al.

(10) Patent No.: US 8,998,500 B2
(45) Date of Patent: Apr. 7, 2015

(54) BEARING SEAL STRUCTURE

(75) Inventors: Morinobu Kawamura, Utsunomiya (JP); Tasuku Sakurai, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 459 days.

(21) Appl. No.: 13/328,265

(22) Filed: Dec. 16, 2011

(65) Prior Publication Data
US 2012/0155791 A1 Jun. 21, 2012

(30) Foreign Application Priority Data

Dec. 21, 2010 (JP) ................. 2010-284861

(51) Int. Cl.
F16C 33/76 (2006.01)
F16C 33/66 (2006.01)
F16C 33/80 (2006.01)
F16C 19/18 (2006.01)

(52) U.S. Cl.
CPC ............. F16C 33/6618 (2013.01); F16C 33/80 (2013.01); F16C 19/186 (2013.01); F16C 2326/02 (2013.01)

(58) Field of Classification Search
CPC ............. F16C 33/6603; F16C 33/6607; F16C 33/6618; F16C 33/6655; F16C 33/762; F16C 33/763; F16C 33/782; F16C 33/80; F16C 33/805
USPC .......... 277/347, 411, 412, 418–421; 384/473, 384/477–489
See application file for complete search history.

(56) References Cited

U.S. PATENT DOCUMENTS

| 3,203,740 | A * | 8/1965 | Peickii et al. | 384/486 |
| 4,895,460 | A | 1/1990 | Grzina | |
| 5,025,917 | A * | 6/1991 | Smith et al. | 198/842 |
| 5,074,408 | A * | 12/1991 | Smith et al. | 198/842 |
| 8,591,116 | B2 * | 11/2013 | Fedorovich | 384/480 |
| 8,641,288 | B2 * | 2/2014 | Metten et al. | 384/480 |
| 2011/0293214 | A1 * | 12/2011 | Houdayer et al. | 384/606 |

FOREIGN PATENT DOCUMENTS

| JP | S35-003454 | | 4/1960 |
| JP | S39-006202 | Y | 3/1964 |
| JP | S40-035364 | Y | 12/1965 |
| JP | S41-023364 | | 11/1966 |
| JP | S47-040186 | Y | 12/1972 |
| JP | S49-40906 | | 11/1974 |
| JP | S55-105623 | | 1/1979 |
| JP | S55-105623 | | 7/1980 |
| JP | S58-091022 | U | 6/1983 |
| JP | S63-501307 | | 5/1988 |
| JP | 2004003586 | | 1/2004 |

OTHER PUBLICATIONS

JPO Communication in related Honda Motor Co., Ltd. JP Application No. 2010-284861, Office Action mailed Dec. 25, 2012, pp. 5 (JP).

(Continued)

Primary Examiner — Alan B Waits
(74) Attorney, Agent, or Firm — William R. Fisher

(57) ABSTRACT

A bearing seal structure includes: a ridge portion provided on an inner race; a groove portion provided on an outer race; and a grease reservoir that is defined by the ridge portion and the groove portion and contains grease for providing a seal between the inner race and outer race.

19 Claims, 13 Drawing Sheets

(56) References Cited

OTHER PUBLICATIONS

Translated abstract of JP2004003586 (see above) from Espacenet. com; accessed on Dec. 16, 2011.

JPO Communication in related Honda Motor Co., Ltd. JP Application No. 2010-284861, Office Action mailed May 21, 2013, pp. 5 (JP).

* cited by examiner

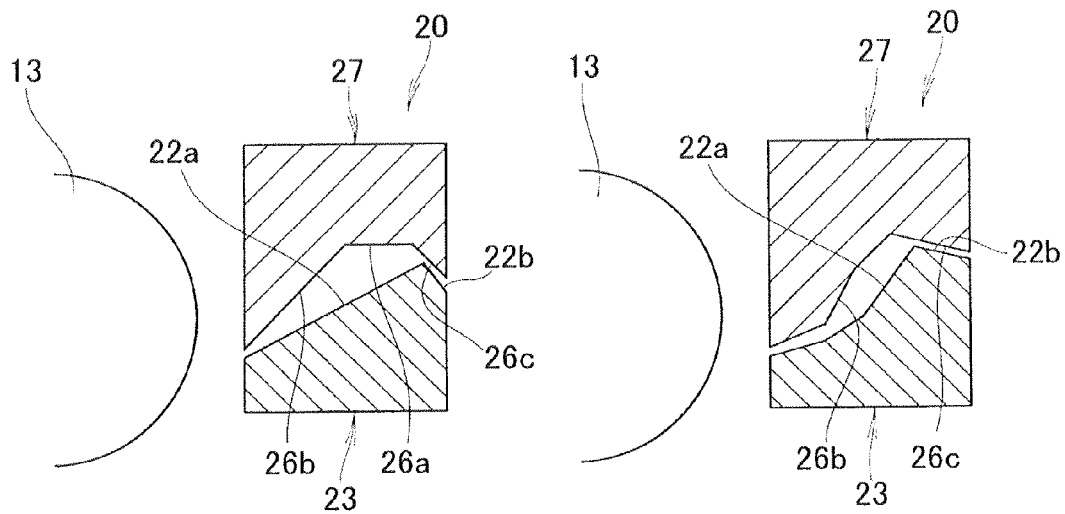
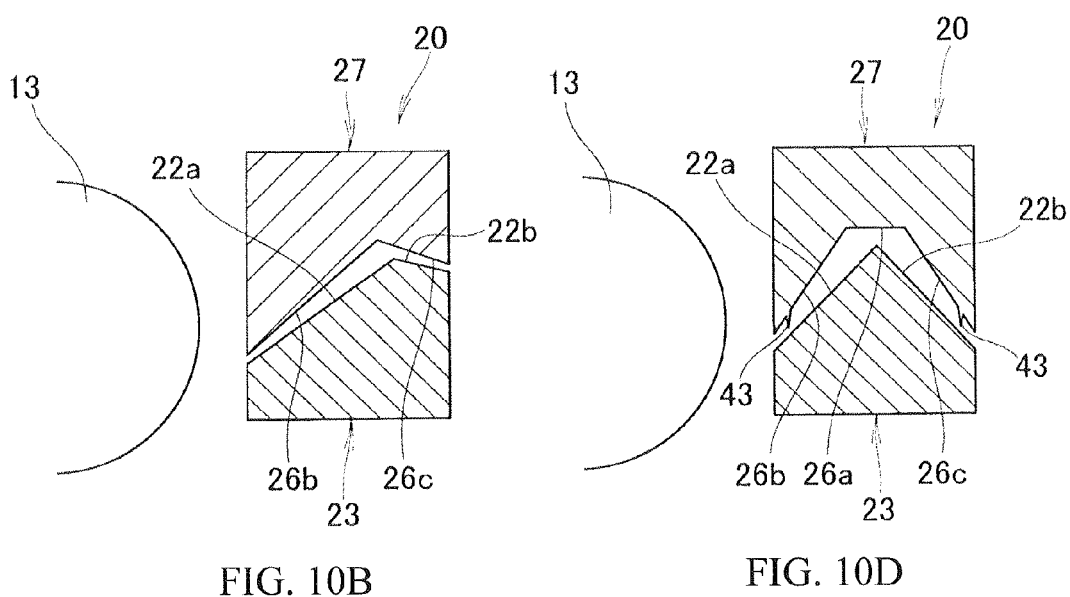
FIG. 10A  FIG. 10C  FIG. 10B  FIG. 10D

BEARING SEAL STRUCTURE

CROSS REFERENCE TO RELATED APPLICATIONS

The present application claims priority under 35 U.S.C. §119 to Japanese Patent Application No. 2010-284861, filed Dec. 21, 2010, entitled "Bearing Seal Structure," the contents of which are incorporated herein by reference in their entirety.

TECHNICAL FIELD

The present disclosure relates generally to a seal structure for bearings and, more particularly, to a seal structure used for automobile bearings.

BACKGROUND

Structures wherein axles are provided on bearings on automobile frames and wheels are supported on these axles are used in automobiles. Seal structures are provided on the bearings so as to prevent entry of foreign materials into the bearings such as mud and water splashed by the wheels.

FIG. 11 is a cross-sectional drawing for explaining the basic structure of a conventional bearing, wherein a bearing 100 includes an inner race 101, an outer race 102, rolling elements 103 that are provided between the inner race 101 and the outer race 102, and a retainer 104 for holding the rolling elements 103. Furthermore, the bearing 100 is provided with oil seals 105 so as to prevent incursion of foreign material from outside into the rolling elements 103.

An example wherein such a bearing 100 is applied to an automobile is shown in FIG. 12. As illustrated in FIG. 12, the outer race 102 is secured by a bolt 107 to an automobile frame 106, where the inner race 101 is attached to the outer race 102 with the rolling elements 103 interposed therebetween, where bolts 108 for holding the inner race 101 to the wheel are provided, and where a driveshaft 109 is connected to the inner race 101. The inner race 101 is rotated by the driveshaft 109, to rotate the wheel through the bolts 108. Oil seals 105 are provided between the inner race 101 and the outer race 102.

As illustrated in FIG. 13, the oil seal 105 is made from a slinger 111, which is L-shaped in cross-section, that fits into the inner race 101, a core 112, which is L-shaped in cross-section, that fits into the outer race 102, a seal member main unit 113 that is provided on the core 112, and ribs 114, 115, and 116 that extend from the seal member main unit to the slinger 111. The seal member main unit 113, including the ribs 114, 115, and 116, and the core 112 are stationary, along with the outer race 102, and do not rotate. On the other hand, the slinger 111 rotates together with the inner race 101.

Because the ribs 114, 115, and 116 contact the slinger 111, they maintain the seal performance. However, the sliding resistance produced through the contact of the ribs 114, 115, and 116 with the slinger 111 is large, consuming a portion of the motive force of the engine, and thus has a negative impact on fuel consumption. Moreover, the ribs 114, 115, and 116 undergo wear on surfaces during use, causing concerns regarding a reduction in seal performance if the amount of wear exceeds a given amount.

Given this, a seal structure that has reduced sliding resistance and that can maintain seal performance over an extended period of time is desired.

SUMMARY

In accordance with one embodiment, a bearing seal structure is provided on a bearing to inhibit the incursion of foreign materials from outside into rolling elements. The bearing includes a rotating inner race, a stationary outer race, and rolling elements provided between the inner race and the outer race. The bearing seal structure includes: an inner seal ring having a ridge portion on an outer peripheral portion provided on the inner race; an outer seal ring having a groove portion on an inner peripheral portion that is arranged opposite the ridge portion and maintains a specific gap therefrom, which is provided on the outer race; and grease that fills a gap between the ridge portion and the groove portion.

In accordance with one embodiment, the specific gap is set so the gap on both edges of the inner seal ring are smaller than the gap at a center of the inner seal ring.

In accordance with one embodiment, a ridge portion is provided on an inner seal ring that rotates together with the inner race and a groove portion is provided on an outer seal ring that is in a stationary state together with the outer race, and grease is sealed between the groove portion and the ridge portion. Centrifugal force acts on the grease through the rotation of the inner seal ring. Centrifugal force directed towards the tip of the ridge portion acts on the grease. The grease is biased to collect in the groove portion. The grease is held within the seal structure, thereby reducing the likelihood that any significant amount of the grease will leak or scatter.

In accordance with one embodiment, the outer seal ring does not contact the inner seal ring. Only shearing resistance is produced in the grease through rotation. The shearing resistance of the grease is less than the conventional sliding resistance between the ribs and the slinger. Therefore, it is possible to reduce the sliding resistance. Moreover, because the outer seal ring does not contact the inner seal ring, the inner seal ring or the outer seal ring are not as likely to wear out, making it possible to maintain seal performance over an extended period of time.

In accordance with one embodiment, gaps on both edges of the inner seal ring are set to be small. Centrifugal force cannot be expected when stopped or when rotating at a low speed. The concern is that, depending on the grease, when stopped or when rotating at a low speed, the grease may leak to the outside from the gaps on both edges of the inner seal ring. In accordance with one embodiment, the gaps on one or both sides of the inner seal ring are set to be small, making it possible to inhibit leakage of the grease. Accordingly, this can increase the scope of types of grease that can be selected.

In accordance with one embodiment, a bearing is provided. The bearing includes an outer race and an inner race. The outer race includes a ring portion with an annular groove. The inner race includes an annular ridge extending therefrom so that at least a portion of the ridge is positioned in the groove to define a reservoir therebetween. The reservoir contains a grease that forms a seal between the outer race and the inner race. The groove may be substantially coaxially aligned with the rotational axis of the bearing.

In accordance with one embodiment, a bearing is provided that includes an inner race, an outer race, and a seal structure. The seal structure includes a first seal ring positioned on the inner race. A second seal ring is positioned on the outer race and has an annular groove for receiving at least a portion of the first seal ring therein. A means is provided for sealing the inner race and the outer race with grease during rotation of the inner race. The means for sealing the inner race and the outer race with grease during rotation of the inner race is performed by an inner face and an outer face of the first seal ring that are inclined so that the grease moves away from the rotational axis of the bearing and up the inner and outer faces during rotation of the first seal ring, due to the centrifugal force, to hold the grease in the groove of the seal structure. The seal structure may include a means for retaining grease in the seal structure while the inner race and the first seal ring are stationary. The means for retaining grease in the seal structure while the inner race and the first seal ring are stationary is performed by the widths of the gaps defined by the first seal ring and the sides of the second seal ring, as measured along a line perpendicular to the bearing rotational axis, each being smaller than the distance between the portions of the first seal ring and the bottom of the groove, as measured along a line perpendicular to the bearing rotational axis, that are positioned farthest away from the rotational axis of the bearing. The first seal ring and the second seal ring may be configured so that they do not contact each other. The seal structure may be open.

BRIEF DESCRIPTION OF THE DRAWINGS

FIG. 10A is a cross-sectional view of a seal structure in accordance with one embodiment of the present disclosure.

FIG. 10B is a cross-sectional view of a seal structure in accordance with one embodiment of the present disclosure.

FIG. 10C is a cross-sectional view of a seal structure in accordance with one embodiment of the present disclosure.

FIG. 10D is a cross-sectional view of a seal structure in accordance with one embodiment of the present disclosure.

DETAILED DESCRIPTION

The apparatus and methods disclosed in this document are described in detail by way of examples and with reference to the appended drawings. Note that the drawings are to be viewed according to the orientations of the reference numbers. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
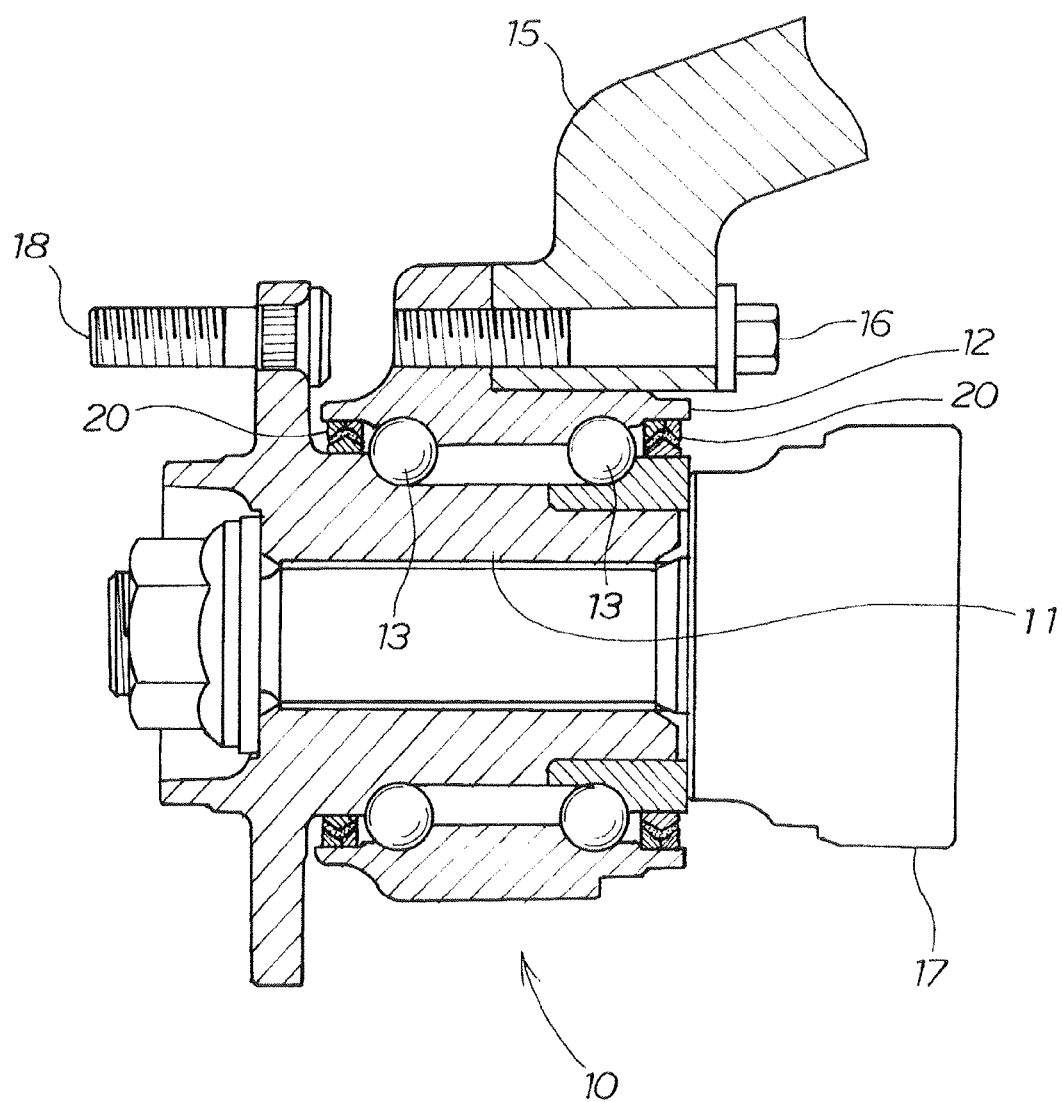
FIG. 1 is a cross-sectional view of a bearing provided with a plurality of seal structures in accordance with one embodiment of the present disclosure.

As illustrated in FIG. 1, a bearing 10 is structured from an inner race 11, an outer race 12, and rolling elements 13 that are provided between the inner race 11 and the outer race 12. The rolling elements 13 may include, but are not limited to, steel balls, cylindrical rollers, conical rollers, or needles. Furthermore, the bearing 10 is provided with seal structures 20 to inhibit the incursion of foreign materials from the outside into the rolling elements 13.

In this type of bearing 10, the outer race 12 is attached to the automobile in a state wherein it is held securely by bolts 16, for example, to the automobile frame 15. In this non-limiting case, a driveshaft 17 is inserted into the inner race 11, a wheel is attached through bolts 18 to the outer surface of the inner race 11, and the inner race 11 is rotated by the driveshaft 17, rotating the wheel. That is, the inner race 11 is a rotating body, and the outer race 12 is a stationary body.

Figure 2:
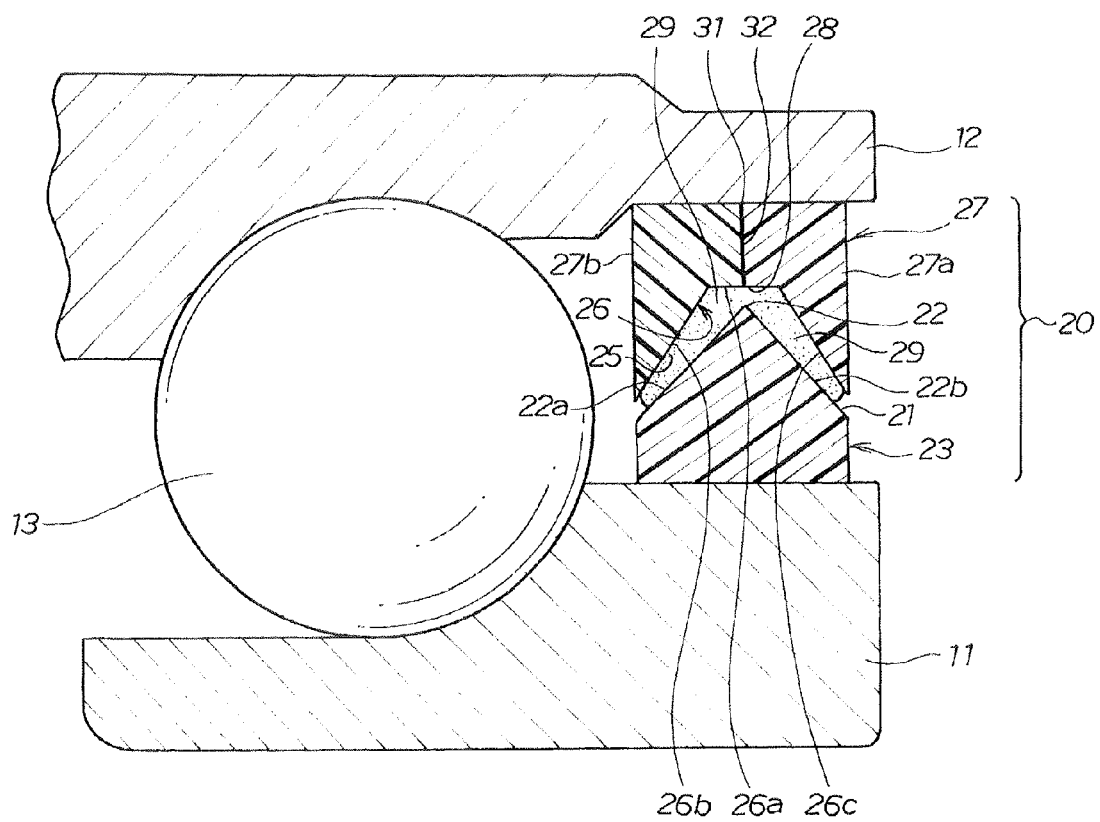
FIG. 2 is an expanded cross-sectional view of one seal structure shown in FIG. 1.

In automobiles, foreign materials such as mud, sand, or the like, that are splashed by the wheel, impinge on the bearing 10. The incursion of these foreign materials into the interior of the bearing 10 is inhibited by the seal structures 20. As illustrated in FIG. 2, the seal structure 20 includes: an inner seal ring 23 having a ridge portion 22 on an outer peripheral portion 21, which is provided on an inner race 11; an outer seal ring 27 provided on the outer race 12 and having a groove portion 26 on an inner peripheral portion 25 that is arranged facing the ridge portion 22 to maintain a gap therebetween; and grease 29 that fills a grease reservoir 28 that is produced between the ridge portion 22 and the groove portion 26. The seal structure 20 may be open so that the grease reservoir 28 is not entirely enclosed by the seal structure 20. The inner seal ring 23 is a rotating body, and the outer seal ring 27 is a stationary body. However, it is to be understood that the seal structure 20 may be provided on bearings 10 having a rotating outer race 12 and a stationary inner race 11. Accordingly, the inner seal ring 23 may be a stationary body, and the outer seal ring 27 may be a rotating body.

As shown in FIG. 2, the ridge portion 22 is made from an inner oblique face 22a on the rolling element 13 side and an outer oblique face 22b on the side opposite from the rolling elements 13. In the present non-limiting example, the inner oblique face 22a and the outer oblique face 22b have identical inclination angles and identical lengths. The groove portion 26 is made from a center or closed portion 26a, an inner oblique face 26b that extends from one edge of the portion 26a to the rolling element 13 side, and an outer oblique face 26c that extends from the other edge of the portion 26a to the side opposite from the rolling elements 13. In the present example, the inner oblique face 26b and the outer oblique face 26c have identical inclination angles and identical lengths. Although the ridge portion 22 is shown as having a pointed tip, it is to be understood that the ridge portion 22 is not limited to such shapes. Other shapes may include, but are not limited to, rounded, flat, and slanted shapes. Although the portion 26a is shown as being flat, it is to be understood that the portion 26a is not limited to such shapes. Other shapes may include, but are not limited to, slanted, convex, and concave shapes. Further, the portion 26a may be a point where the faces 26b and 26c intersect.

Note that for ease in assembly, the outer seal ring 27 may be structured from a pair of half-ring members 27a and 27b. That is, the pair of half-ring members 27a and 27b are joined together with at least a portion of the inner seal ring 23 positioned therebetween, and the joints 31 are bonded by a bonding agent 32, to integrate the pair of half-ring members 27a and 27b into a single unit, to form the outer seal ring 27.

After assembly, the pair of half-ring members 27a and 27b do not come apart, and thus the explanation below will be for a form of the outer seal ring 27 having no joints.

A non-reinforced type of PPS (polyphenylene sulfide) resin is well-suited for the material for the inner seal ring 23 and the outer seal ring 27. Polyphenoline sulfide (PPS) resin is a type of crystalline thermoplastic engineering plastic, which, in addition to mechanical strength and rigidity which are similar to those of metal, has excellent thermal durability. The "non-reinforced type" indicates that no reinforcing materials, such as fiberglass, are included therein.

Note that the materials for the inner seal ring 23 and the outer seal ring 27 may, instead of being the non-reinforced type of PPS, be a reinforced type of aromatic plastic such as PPS or PEEK (polyether ether ketone), or the like, PA66 (polyamide), or another engineering plastic. Moreover, in contemplation of being pressed-fitted into the inner and outer races of the bearing and of the inner seal ring 23 and the outer seal ring 27 not contacting each other, the material for the inner seal ring 23 and the outer seal ring 27 may instead be a metal, such as stainless steel. It is to be understood that the inner seal ring 23 may be integral with the inner race 11. The outer seal ring 27 may be integral with the outer race 12.

In a non-limiting example, for the grease 29, the thickening agent may be urea, and the grease may have a worked penetration of about 286. In a non-limiting example, "Pyronoc Universal N6C" manufactured by Nippon Oil Corporation is well-suited. Note that the grease 29, instead of being Pyronoc Universal N6C, may instead be one or more other greases, including, but not limited to, greases that use an aluminum complex as the thickening agent, for the purpose of improving the durability to moisture, or a low penetration grease (a hard grease), for the purpose of improving the durability to internal pressure variation, or the like. However, it is to be understood that any grease or grade thereof that may be used with bearings may be used. A variety of thickeners may be used including, but not limited to urea, lithium soaps and complexes, fluorinated polymers, carbon black, calcium soaps and complexes, aluminum soaps and complexes, or mixtures thereof. A variety of base oils may be used including, but not limited to, mineral oil, silicone oil, polyalphaolefins, or mixtures thereof.

Figure 3:
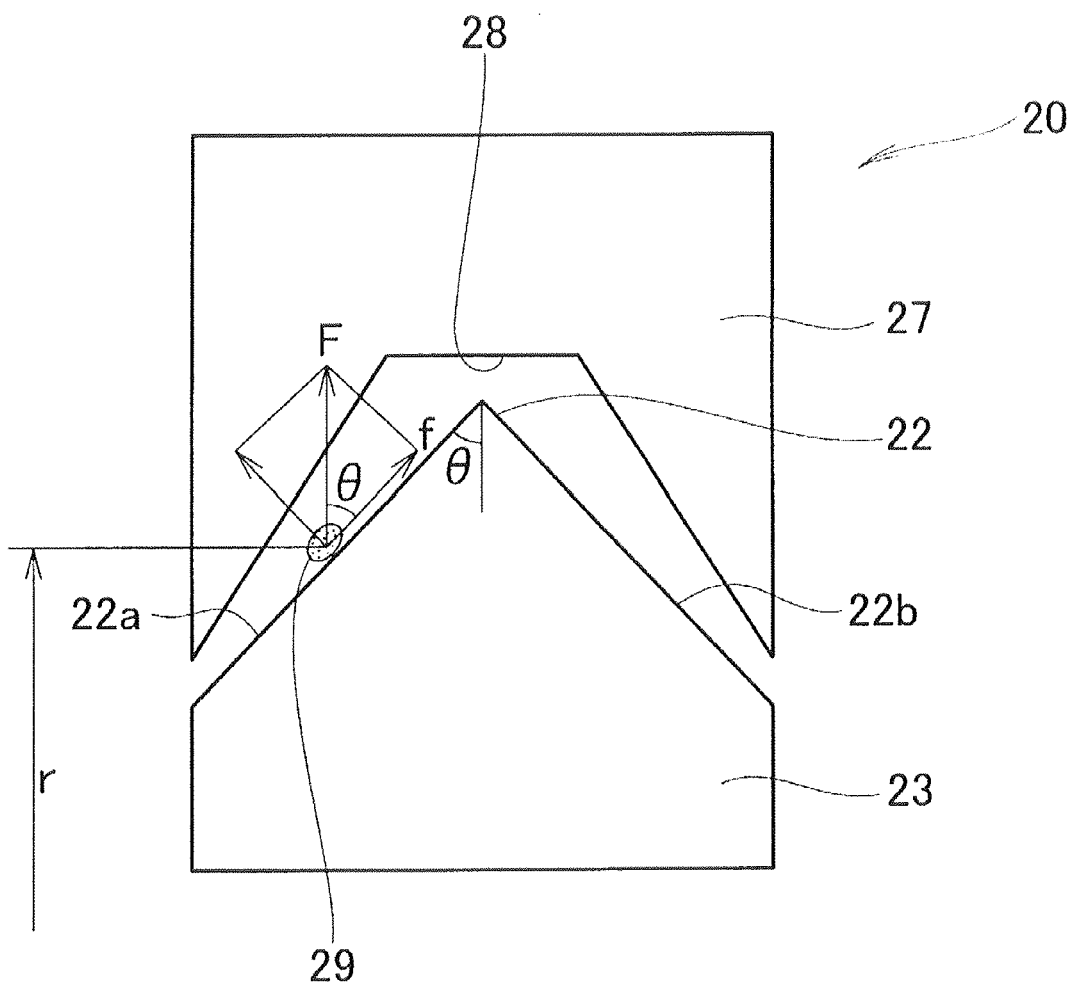
FIG. 3 is a cross-sectional view of a seal structure in accordance with one embodiment of the present disclosure.

The effects of the seal structure 20 having the structure set forth above will be explained next. In FIG. 3, the inner seal ring 23 is a rotating body and the outer seal ring 27 is a stationary body. If the angular velocity of the inner seal ring 23 is ω, the mass of the grease 29 is m, and the radius of rotation of the grease 29 is r, then the centrifugal force F that acts on the grease 29 is $mr\omega^2$.

If the inclination angle, relative to the center line, of the ridge portion 22 is θ, then the centrifugal component force f that acts on the grease 29 is F·cos θ. That is, the grease 29 will move up the oblique faces 22a and 22b of the ridge portion 22 due to the centrifugal component force f, toward the grease reservoir 28. That is, a centrifugal force is produced through the rotation of the inner seal ring 23, so the grease 29 will accumulate in a portion of the grease reservoir 28. As a result, the grease 29 is held in the seal structure 20.

Whether or not this effect is exhibited is confirmed through testing.

Test Examples

Test examples prepared according to the present disclosure are described below. However, the present disclosure is not limited to these test examples.

Figure 4A:
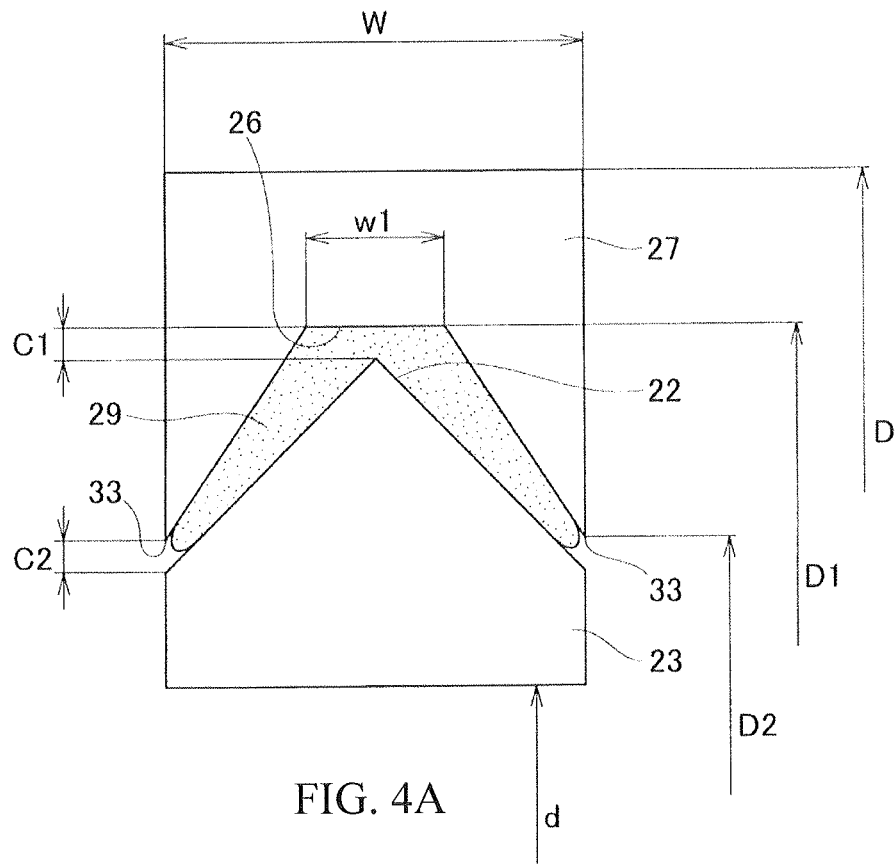
FIG. 4A is a cross-sectional view of a seal structure in accordance with one embodiment of the present disclosure.
Figure 4B:
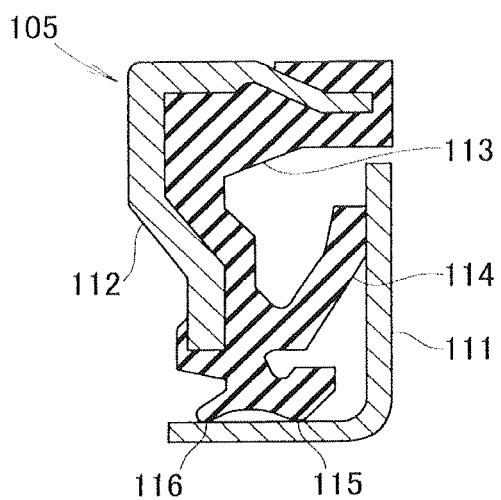
FIGS. 4B and 4C are cross-sectional views of prior art oil seals.
Figure 4C:
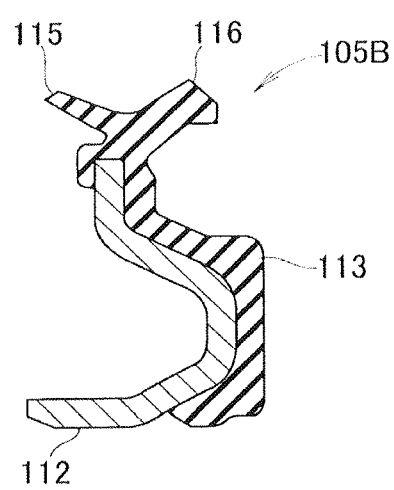

FIGS. 4A, 4B, and 4C are for explaining the form of test pieces used in testing. As illustrated in FIG. 4A, the width of the outer seal ring 27 is defined as W, the width of the bottom (the flat portion) of the groove portion 26 is defined as w1, the outer diameter of the outer seal ring 27 is defined as D, the diameter of the bottom (the flat portion) of the groove portion 26 is defined as D1, the inner diameter (the minimum value) of the outer seal ring 27 is defined as D2, the inner diameter of the inner seal ring 23 is defined as d, the width of the gap between the bottom (the flat portion) of the groove portion 26 and the ridge portion 22 (the tip) is defined as C1, and the width of the gap (or annular aperture) 33 between the outer seal ring 27 and the inner seal ring 23 on the left and right sides thereof is defined as C2. The width of the inner seal ring 23 is also W.

Figure 13:
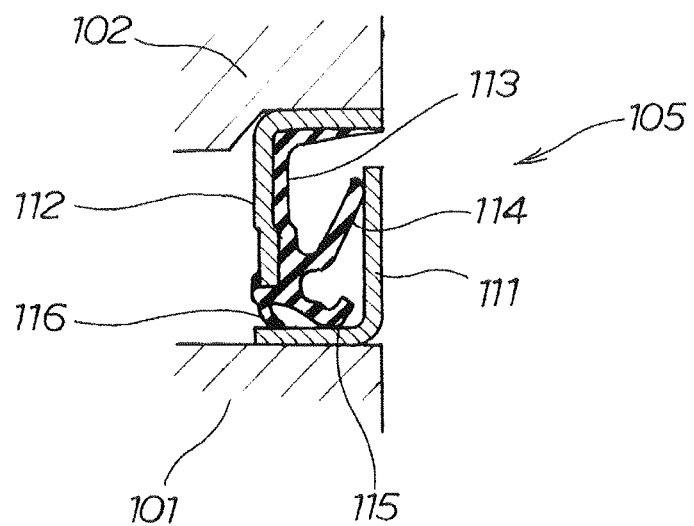
FIG. 13 is a portion of the cross-sectional view of FIG. 12 enlarged for magnification purposes.

For comparison, an oil seal 105 structured as illustrated in FIG. 4B and an oil seal 105B, illustrated in FIG. 4C, were prepared. The reference numbers for FIGS. 4B and 4C are the same as those in FIG. 13, so explanations thereof are omitted.

Figure 5A:
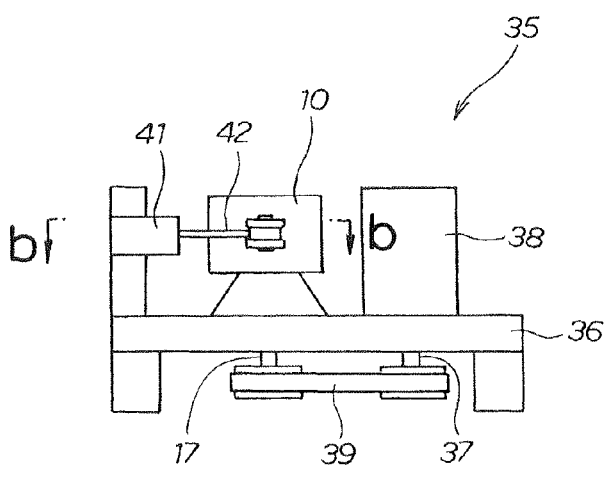
FIG. 5A is a side view of a torque measuring device.
Figure 5B:
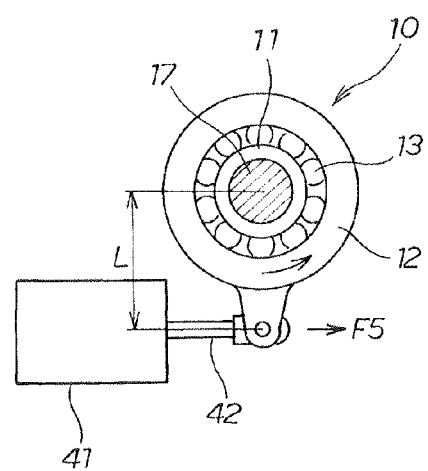
FIG. 5B is a partial overhead view of the torque measuring device shown in FIG. 5A.

FIGS. 5A and 5B show diagrams for explaining the principle of the test equipment, where, as illustrated in FIG. 5A, a variable-speed motor 38, wherein the motor shaft 37 has a vertical configuration, was attached to a test machine base 36 so that the motor shaft was at the bottom, and a driveshaft 17 was attached to the bearing 10 so as to be vertical, and the motor shaft 37 and the driveshaft 17 were connected by a belt 39 to prepare the test machine 35.

In addition, as illustrated in FIG. 5B, a load cell (load meter) 41 was attached to the test machine 35, where a sensor rod 42 of the load cell 41 was connected to the outer race 12. While actually the outer race 12 may be a stationary component, for purposes of testing it was allowed to rotate, in a design where the rotation was stopped by the sensor rod 42.

When the driveshaft 17 and the inner race 11 were rotated in a counterclockwise direction as shown in FIG. 5B, the rolling elements 13 and the outer race 12 rotated accordingly, due to the contact resistance with the rolling elements 13 and the seal structure (in FIGS. 4A, 4B, and 4C), and, with respect to the seal structure shown in FIG. 4A, the shearing resistance of the grease. The magnitude of the resulting torque is the product of the force F5, measured by the sensor rod 41, and the distance L from the center of rotation to the sensor rod 41, and specifically the magnitude is calculated as F5×L. This F5×L is the torque.

The torque measurement is that by which the seal structures (FIGS. 4A, 4B, and 4C) are evaluated, and thus it is necessary to exclude the torque that acts on the rolling members 13. Given this, the torque was calculated as in the summary shown in Table 1.

TABLE 1

| | Testing Method | Measured torque |
|---|---|---|
| Stage I Testing | Performed in a state wherein the seal structure or oil seal was removed. | Ta1 |
| Stage II Testing Torque | Performed in a state wherein the seal structure or oil seal is attached on only one side. T = (Ta2 − Ta1) | Ta2 |

The measured torque Ta1 is the torque relating to the rolling elements. The measured torque Ta2 is torque relating to the rolling elements and the seal structure (or the oil seal). The torque T that is calculated by Ta2−Ta1 is the torque relating to the seal structure (or the oil seal).

Figure 6:
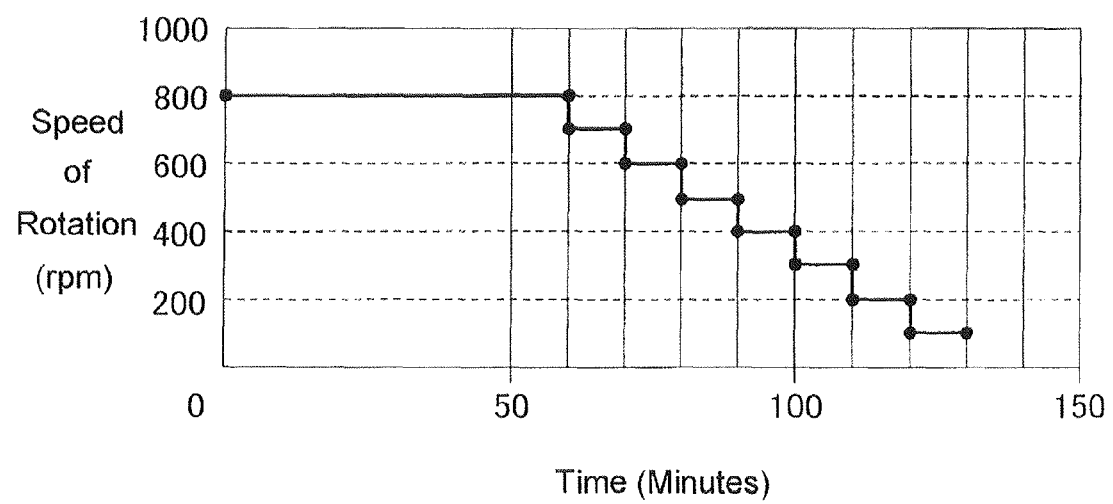
FIG. 6 is a graph illustrating test conditions.

The tests were performed while changing the speed of rotation of the driveshaft 17 in the pattern illustrated in FIG. 6. That is, the rotation tests were performed at 800 RPM (revolutions per minute) for 60 minutes, and reduced by 100 RPM increments every ten minutes until finishing at a speed of 100 RPM for 10 minutes.

The dimensions of the seal structures used in the test were as given in Table 2.

TABLE 2

| | Form | Dimensions (mm) | | | | | | | |
|---|---|---|---|---|---|---|---|---|---|
| | | W | w1 | D | D1 | D2 | d | C1 | C2 |
| Example 1 | FIG. 4 (a) | 5 | 1.5 | 69 | 65 | 59.5 | 55.5 | 0.5 | 0.5 |
| Example 2 | FIG. 4 (a) | 5 | 1.5 | 69 | 65 | 59.5 | 55.5 | 1.0 | 0.5 |
| Example 3 | FIG. 4 (a) | 5 | 1.5 | 69 | 65 | 59.5 | 55.5 | 1.5 | 0.5 |
| Example 4 | FIG. 4 (a) | 5 | 1.5 | 69 | 65 | 59.5 | 55.5 | 1.0 | 0.2 |
| Example 5 | FIG. 4 (a) | 5 | 1.5 | 69 | 65 | 59.5 | 55.5 | 1.0 | 1.0 |
| Example 6 | FIG. 4 (a) | 5 | 1.5 | 69 | 65 | 59.5 | 55.5 | 1.0 | 1.5 |
| Comparative Example 1 | FIG. 4 (b) | | | | | | | | |
| Comparative Example 2 | FIG. 4 (c) | | | | | | | | |

Examples 1 through 6 are non-limiting test examples of seal structures prepared in accordance with the present disclosure. The dimensions W, w1, D, D1, D2, and d were the same in all of the test Examples 1 through 6. That is, the differences were in the gap C1 and the gap C2. The first stage testing and the second stage testing were performed under these conditions. The torques obtained are given below in Table 3.

Figure 7:
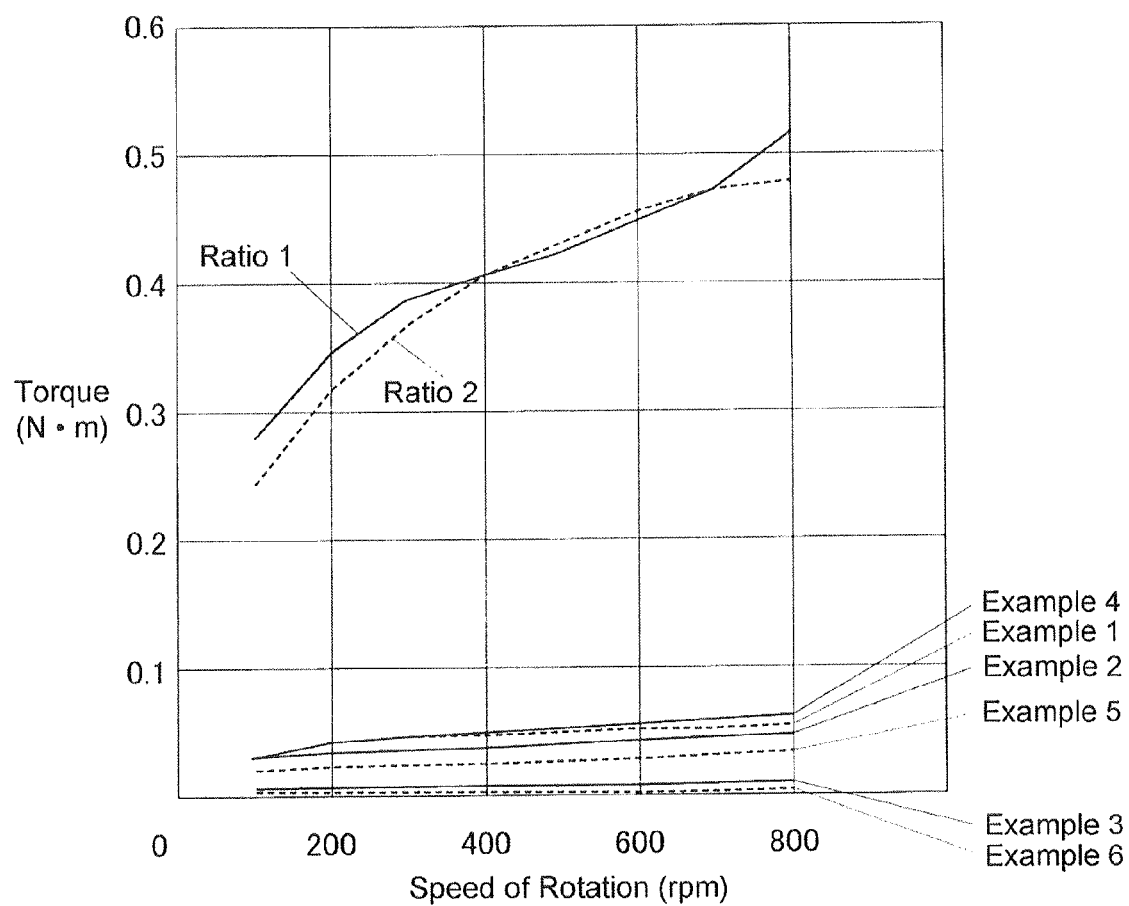
FIG. 7 is a graph illustrating test results.

As illustrated in FIG. 7, the torques were large in the Comparative Example 1 (Ratio 1 in FIG. 7) and Comparative Example 2 (Ratio 2 in FIG. 7) that use the oil seals shown in FIGS. 4B and 4C. On the other hand, in the seal structure of Examples 1 through 6 exhibited substantially lower torques.

In order to further evaluate the seal structure of Examples 1 through 6, the torques were compared at 800 rpm.

TABLE 3

| | Torque (at 800 RPM) | Relative Comparison | Grease Leakage |
|---|---|---|---|
| Example 1 | $56 \times 10^{-3}$ N·m | 7.8 x | No |
| Example 2 | $42.7 \times 10^{-3}$ N·m | 5.9 x | No |
| Example 3 | $7.2 \times 10^{-3}$ N·m | Reference | No |
| Example 4 | $58.3 \times 10^{-3}$ N·m | 8.1 x | No |
| Example 5 | $32.4 \times 10^{-3}$ N·m | 4.5 x | No |
| Example 6 | $4.3 \times 10^{-3}$ N·m | 0.6 x | Yes |
| Comparative Example 1 | $515 \times 10^{-3}$ N·m | 71.5 x | — |
| Comparative Example 2 | $480 \times 10^{-3}$ N·m | 66.7 x | — |

Grease leakage was observed in Example 6. No grease leakage was observed in Examples 1 through 5. Of the Examples 1 through 5, Example 3 had the best torque results. When Example 3 is defined as the reference (1.0), relative comparisons can be made, such as Example 1 being 7.8 times that of Example 3. Without being limited to any particular theory, the relative differences are believed to be related to the magnitudes of the gaps C1 and C2.

Figure 8:
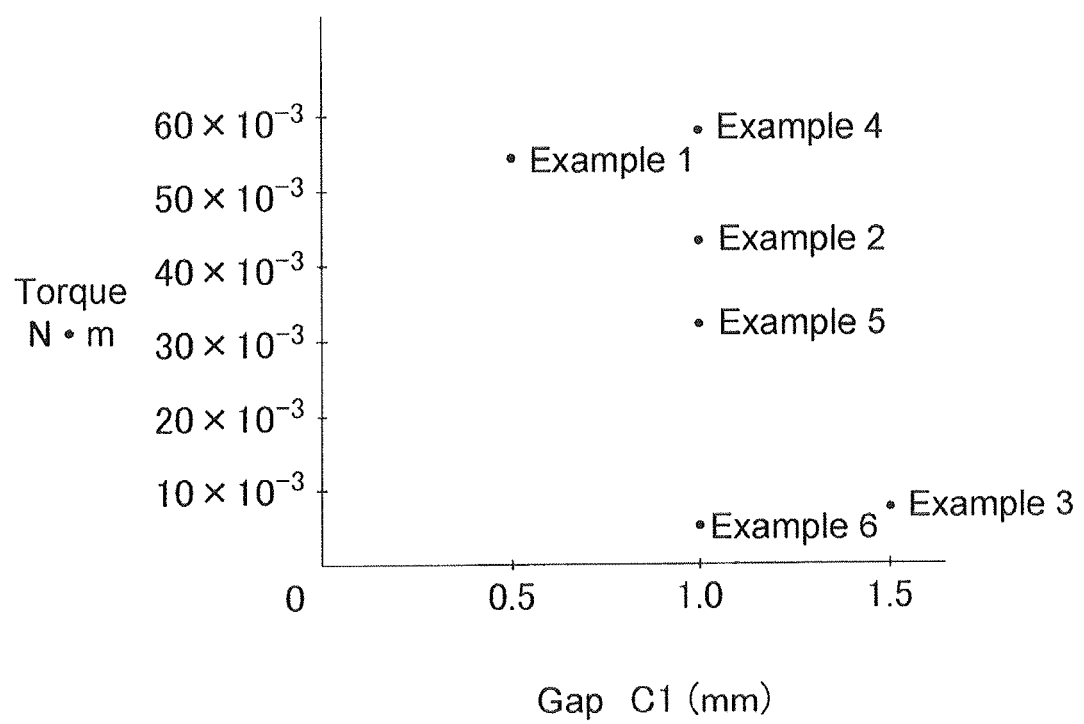
FIG. 8 is a graph showing the correlation between a gap C1 and torque.

Given this, the correlation between the C1 and the torque and the relationship between the C2 and the torque were considered individually. FIG. 8 is a graph looking at the correlation between the gaps and C1 shown in Table 2 and the torques shown in Table 3. In Example 1, the gap C1 is small, and the volume of the grease reservoir is small. The torque being larger is believed to be a result of this. In Example 3, the gap C1 is large, and the volume of the grease reservoir is large. The torque being smaller is believed to be a result of this.

Figure 9:
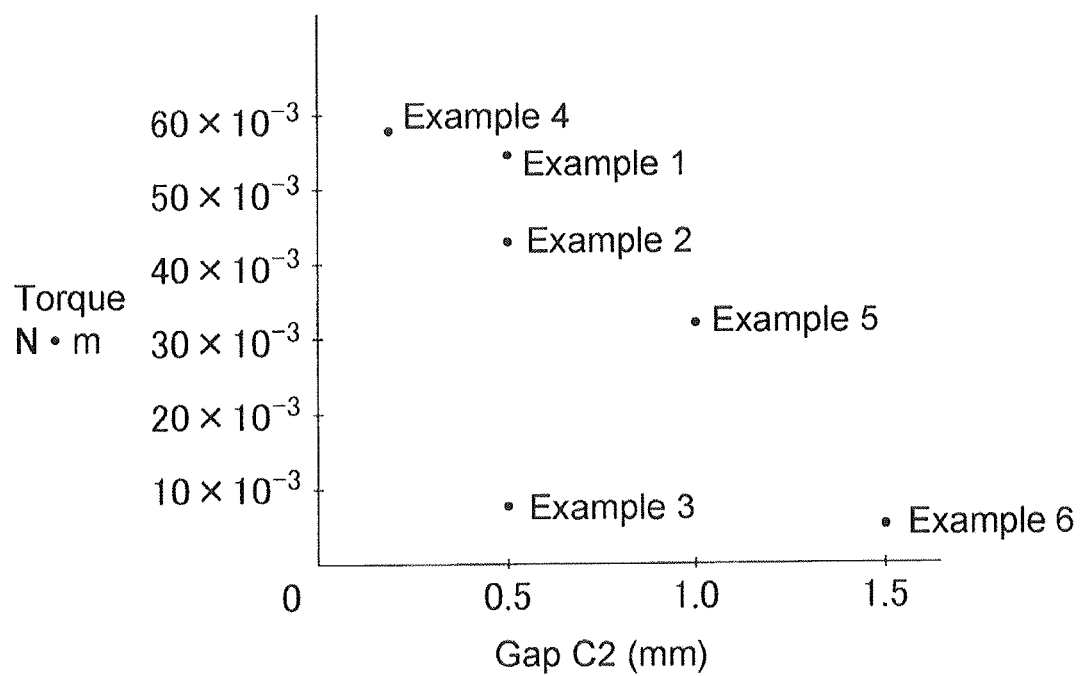
FIG. 9 is a graph showing the correlation between a gap C2 and torque.
Figure 11:
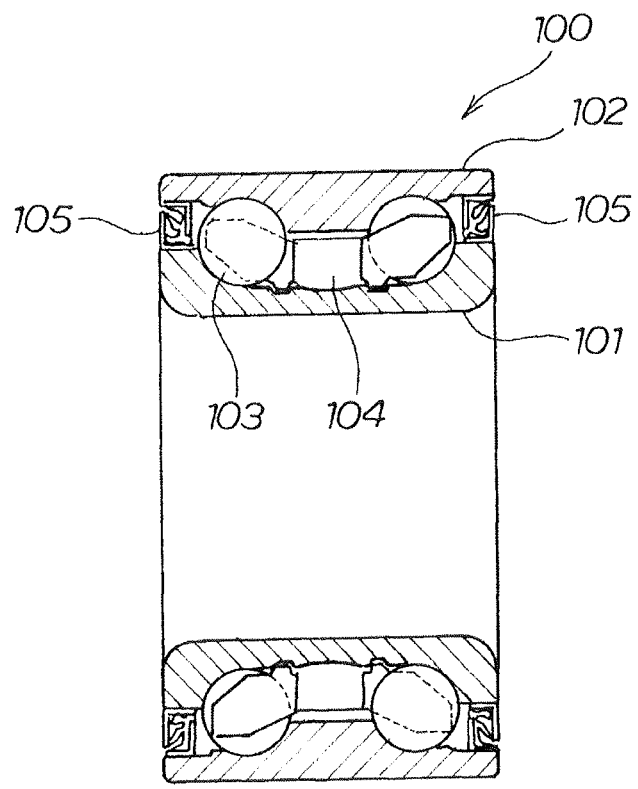
FIG. 11 is a cross-sectional view of a prior art oil seal.
Figure 12:
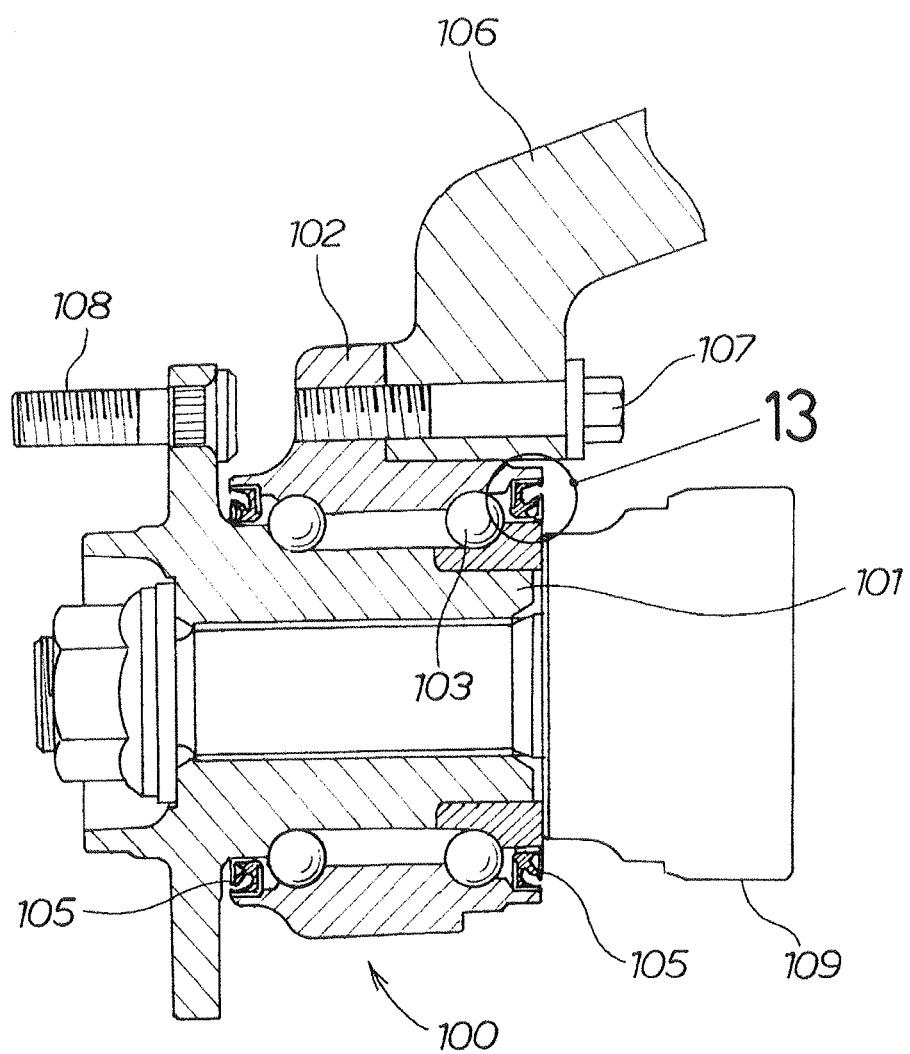
FIG. 12 is a cross-sectional view of a prior art oil seal in an automobile bearing.

FIG. 9 is a graph looking at the correlation between the gaps and C2 shown in Table 2 and the torques shown in Table 3. In Example 4, it is believed that the torque is larger because the gap C2 was small, at 0.2 mm. In Example 6, it is believed that the torque was low because the gap C2 was large. However, in Example 6, there was leakage of grease. In a non-limiting example, the gap C2 may be in a range of between about 0.2 and less than 1.5 mm. In yet another non-limiting example, the gap C2 may be in a range of between about 0.5 and about 1.0 mm. In a non-limiting example, the gap C1 may be in a range of about 1.0 to about 1.5 mm.

However, in bearings that support wheels, the dimensions vary depending on the size of the automobile. For the purposes of generalizability, it is desirable to have a correlation between the size of the seal structure and the gaps C1 and C2, which may then be used to size the seal structure for bearings of different average diameters. From Table 2, the average diameter of the seal structure is 62.25 mm, calculated as $(D+d)/2=(69+55.5)/2=62.25$.

In a non-limiting example, the gap of C1 is greater than or equal to about 0.5 mm, and when divided by 62.25 mm, provides a ratio of greater than or equal to about 0.008. Assuming that the gap C1 will be proportional to the size of the seal structure, then the gap C1=(greater than or equal to about 0.008)×the average diameter of the bearing. In yet another non-limiting example, the ratio range for the gap C1 of about 1.0 through about 1.5 mm, when divided by 62.25 mm is about 0.016 through about 0.024. Assuming that the gap C1 will be proportional to the size of the seal structure, then the gap C1=(about 0.016 through about 0.024)×the average diameter of the bearing.

In a non-limiting example, the gap C2 has a range of about from 0.2 to less than 1.5 mm, when divided by 62.25 mm, provides a ratio range of from about 0.003 to less than 0.024. Assuming that the gap C2 will be proportional to the size of the seal structure, then the gap C2=(from about 0.003 to less than 0.024)×the average diameter of the bearing. In yet another non-limiting example, the gap C2 has a range of from about 0.5 through about 1.0 mm, when divided by the 62.25 mm, provides a ratio of from about 0.008 through about 0.016. Assuming that the gap C2 will be proportional to the size of the seal structure, then the gap C2=(from about 0.008 through about 0.016)×the average diameter of the bearing.

Given the curves for Examples 1 through 6 in FIG. 7, there was essentially no change in torque over a range of rotational speeds of 100 to 800 rpm. The rotational speeds of between 100 and 800 rpm correspond to the speeds of rotation of wheels in normal travel. Consequently, in a typical vehicle, the seal structures according to the present disclosure will have no significant grease leakage and will have reduced resistance torque Other illustrative examples of the seal structure will be explained with reference to FIGS. 10A, 10B, 10C, and 10D. As illustrated in FIG. 10A, the inner oblique face 22a may be longer than the outer oblique face 22b, and the inner oblique face 26b may be longer than the outer oblique face 26c. As illustrated in FIG. 10B, the inner oblique face 26b may be connected directly to the outer oblique face 26c to simplify the structure.

As illustrated in FIG. 10C, the inner oblique faces 22a and 26b may also be a plurality of faces, and may be formed as curved surfaces. As illustrated in FIG. 10D, ribs 43 may be formed protruding from the outer seal ring 27 to the inner seal ring 23. Leakage of grease can be suppressed by these ribs 43. Although only shown as protruding from the outer seal ring 27, it is to be understood that one or more ribs 43 may protrude from the ridge portion 22 only, or in combination with one or more ribs 43 extending from the outer seal ring 27.

While the bearing seal structure is well-suited to automobiles, it may also be applied to machines other than automobiles.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described to best illustrate the principles of the invention and various embodiments as are suited to the particular use contemplated. The scope of this disclosure is, of course, not limited to the examples or embodiments set forth herein, but can be employed in any number of applications and equivalent devices by those of ordinary skill in the art. Rather it is hereby intended the scope of this disclosure be defined by the claims appended hereto.

What is claimed is:

1. A bearing comprising:
    an outer race including a ring portion with a width and an annular groove, the groove includes a first wall, a second wall, and a third wall, the third wall has a width and is positioned parallel to an axis of rotation of the bearing, the first wall extends toward the bearing axis of rotation at an angle obtuse to the third wall, and the second wall extends toward the bearing axis of rotation at an angle obtuse to the third wall; and
    an inner race including an annular ridge extending therefrom, the annular ridge is interposed between the inner race and the third wall, the ridge has a width that is greater than the width of the third wall and the ridge extends along the entire width of the third wall, at least a portion of the ridge is positioned in the groove to define a reservoir therebetween, the reservoir containing a grease that forms a seal between the outer race and the inner race, and the ridge including a first side positioned oblique to the first wall of the groove and to the bearing axis of rotation.

2. The bearing of claim 1, wherein the first side of the ridge and the first wall of the groove extend from the reservoir toward a first annular aperture defined by the ring portion and the ridge, wherein a second side of the ridge is positioned opposite and oblique to the second wall of the groove, and wherein the second wall of the groove and the second side of the ridge extend from the reservoir toward a second annular aperture defined by the ring portion and the ridge.

3. The bearing of claim 2, wherein the width of the first aperture as measured between the first side of the ridge and the first wall of the groove is narrower than the distance measured from a tip of the ridge to the third wall of the groove, and wherein the width of the second aperture as measured between the second side of the ridge and the second wall of the groove is narrower than the distance measured from the tip of the ridge to the third wall of the groove.

4. The bearing of claim 2, wherein the first side of the ridge and the first wall of the groove incline toward each other as they extend toward the first aperture.

5. The bearing of claim 2, wherein the second side of the ridge and the second wall of the groove incline toward each other as they extend toward the second aperture.

6. The bearing of claim 1, wherein the first wall of the groove includes an end that extends toward the bearing axis of rotation, and the second wall of the groove includes an end that extends toward the bearing axis of rotation, wherein the end of the first wall and the ridge define a first annular aperture that opens into a chamber between the inner and outer races that houses at least one rolling element, and the end of the second wall and the ridge define a second annular aperture that opens to the exterior of the bearing, wherein the ridge includes a second side positioned opposite and oblique to the second wall of the groove, and wherein the ends of the first and second walls of the groove are positioned farther away from the bearing axis of rotation than any portion of the inner race that is positioned between the chamber housing the at least one rolling element and the first aperture.

7. The bearing of claim 6, wherein the first groove side wall extends toward the bearing axis at an inclination angle different than an inclination angle of the second groove side wall.

8. The bearing of claim 6, wherein the first side of the ridge extends along a line from a tip of the ridge toward the bearing axis of rotation, and the chamber housing the at least one rolling element is partially positioned along the line between the tip and the bearing axis of rotation.

9. The bearing of claim 1, further comprising a rib extending from the ring portion toward the ridge.

10. The bearing of claim 9, wherein the distance between the rib and the first ridge side is less than the width of the first aperture defined by the ring portion and the ridge.

11. The bearing of claim 1, wherein the outer race is stationary and the inner race is rotatable.

12. The bearing of claim 1, wherein the grease comprises a lithium grease, calcium grease, urea grease, aluminum grease, or mixtures thereof.

13. The bearing of claim 1, wherein the third wall has a first end and a second end, the first wall extends from the first end of the third wall toward the bearing axis of rotation, and the second wall extends from the second end of the third wall toward the bearing axis of rotation.

14. The bearing of claim 1, wherein the ridge includes a tip positioned in the groove, wherein the tip is defined by the intersection of the first side of the ridge and a second side of the ridge, wherein the first side of the ridge extends from the tip along a line toward the bearing axis of rotation and defines a first annular aperture with the first wall of the groove, wherein the first aperture opens into a chamber between the inner and outer races that houses at least one rolling element, wherein the chamber is partially positioned along the line between the tip of the ridge and the bearing axis of rotation, wherein the second side of the ridge is positioned opposite and oblique to the second wall of the groove and extends from the tip toward the bearing axis of rotation and defines a second annular aperture with the second wall of the groove, wherein the second aperture opens to the exterior of the bearing, wherein the third wall has a first end and a second end, and the tip of the ridge is positioned along the bearing axis of rotation between the first and second ends of the third wall.

15. A bearing seal structure, to be provided on a bearing to inhibit incursion of foreign materials from outside into rolling elements;
    the bearing having an axis of rotation and comprising a rotating inner race, a stationary outer race, and rolling elements provided between the inner race and the outer race; and
    the bearing seal structure comprising:
    an inner seal ring having a base with a wall that extends outward from the inner race perpendicular to the axis of rotation and a ridge portion on an outer peripheral portion provided on the base, the ridge portion includes a wall that extends from the base wall away from the bearing axis of rotation and forms an acute angle of inclination with a line perpendicular to the bearing axis of rotation;

an outer seal ring provided on the outer race and having a width and a groove portion on an inner peripheral portion that is arranged opposite the ridge portion to maintain a specific gap therefrom, the outer seal ring includes a wall that extends away from the bearing axis of rotation and forms an acute angle of inclination with a line perpendicular to the bearing axis of rotation, wherein the angle of inclination of the ridge portion wall is greater than the angle of inclination of the outer seal ring wall, and wherein the inner seal ring is interposed between the inner race and the outer seal ring and extends along the entire width of the outer seal ring; and grease that fills at least a portion of the gap between the ridge portion and the groove portion.

16. The bearing seal structure of claim 15, wherein the specific gap between the groove portion and the ridge portion is set so that the widths of the gap measured along a line perpendicular to the axis of rotation between the inner seal ring and both outermost edges of the outer seal ring are each smaller than the width of the gap at a center of the inner seal ring.

17. A bearing seal structure comprising;
a rotating inner race;
a stationary outer race;
at least one rolling element provided between the inner race and the outer race;
an inner seal ring having a ridge portion on an outer peripheral portion provided on the inner race, the inner seal ring includes a wall oblique to an axis of rotation of the bearing;
an outer seal ring provided on the outer race and having a groove portion on an inner peripheral portion that is arranged opposite the ridge portion to maintain a specific gap therefrom, the outer seal ring includes a wall oblique to the bearing axis of rotation, wherein the outer seal ring wall and the ridge portion define a first annular aperture that opens into a chamber between the inner and outer races that houses at least one rolling element, the inner seal ring wall is positioned opposite and oblique to the outer seal ring wall, the inner seal ring wall extends along a line toward the bearing axis of rotation, and the chamber housing the at least one rolling element is partially positioned along the line between the ridge portion and the bearing axis of rotation; and grease that fills at least a portion of the gap between the ridge portion and the groove portion.

18. The bearing seal structure of claim 17, wherein the outer seal ring includes a second wall and a third wall, the third wall of the outer seal ring has a width and is positioned along the bearing axis of rotation between the first wall of the outer seal ring and the second wall of the outer seal ring, the first wall of the outer seal ring extends toward the bearing axis of rotation at an angle obtuse to the third wall of the outer seal ring and the second wall of the outer seal ring extends toward the bearing axis of rotation at an angle obtuse to the third wall of the outer seal ring, and the inner seal ring is interposed between the inner race and the third wall of the outer seal ring, and the inner seal ring has a width that extends along the entire width of the third wall of the outer seal ring, wherein the first wall of the inner seal ring and the first wall of the outer seal ring extend toward the first annular aperture, wherein a second wall of the inner seal ring is positioned opposite and oblique to the second wall of the outer seal ring, and wherein the second wall of the outer seal ring and the second wall of the inner seal ring extend toward a second annular aperture defined by the inner seal ring and the outer seal ring, wherein the first wall of the inner seal ring and the first wall of the outer seal ring incline toward each other as they extend toward the first aperture, and wherein the second wall of the inner seal ring and the second wall of the outer seal ring incline toward each other as they extend toward the second aperture.

19. A bearing seal structure comprising;
a rotating inner race;
a stationary outer race;
at least one rolling element provided between the inner race and the outer race;
an inner seal ring having a ridge portion on an outer peripheral portion provided on the inner race, the ridge portion includes a first side that is oblique to an axis of rotation of the bearing;
an outer seal ring provided on the outer race and having a groove portion on an inner peripheral portion that is arranged opposite the ridge portion to maintain a specific gap therefrom, the groove portion includes a first wall oblique to the bearing axis of rotation, wherein the first wall of the groove portion includes an end that extends toward the bearing axis of rotation, and a second wall of the groove portion includes an end that extends toward the bearing axis of rotation, wherein the end of the first wall of the groove portion and the ridge portion define a first annular aperture that opens into a chamber between the inner and outer races that houses at least one rolling element, and the end of the second wall of the groove portion and the ridge portion define a second annular aperture that opens to the exterior of the bearing, wherein the ridge portion includes a second side positioned opposite and oblique to the second wall of the groove portion, and wherein the ends of the first and second walls of the groove portion are positioned farther away from the bearing axis of rotation than any portion of the inner race that is positioned between the chamber housing the at least one rolling element and the first aperture; and grease that fills at least a portion of the gap between the ridge portion and the groove portion.

* * * * *